United States Patent
Babaheidarian et al.

(10) Patent No.: US 11,038,719 B2
(45) Date of Patent: Jun. 15, 2021

(54) CHANNEL ESTIMATION FOR SYSTEMS WITH PLL PHASE DISCONTINUITIES

(71) Applicant: QUALCOMM Incorporated, San Diego, CA (US)

(72) Inventors: Parisa Babaheidarian, Acton, MA (US); Vijayvaradharaj Tirucherai Muralidharan, Bangalore (IN); Murali Menon, Acton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 16/399,835

(22) Filed: Apr. 30, 2019

(65) Prior Publication Data

US 2020/0351124 A1  Nov. 5, 2020

(51) Int. Cl.
*H04L 25/02* (2006.01)
*H04L 5/00* (2006.01)
*H04L 5/16* (2006.01)
*H04L 7/04* (2006.01)

(52) U.S. Cl.
CPC .......... *H04L 25/0222* (2013.01); *H04L 5/006* (2013.01); *H04L 5/16* (2013.01); *H04L 7/04* (2013.01); *H04L 25/022* (2013.01); *H04L 25/0224* (2013.01)

(58) Field of Classification Search
CPC .......... H04L 25/0222; H04L 5/16; H04L 7/04
See application file for complete search history.

(56) References Cited

U.S. PATENT DOCUMENTS

| 8,116,389 B2* | 2/2012 | Nakao | H04B 7/0671 |
| | | | 375/260 |
| 9,769,777 B2* | 9/2017 | Inoue | H01Q 1/246 |
| 9,825,783 B1* | 11/2017 | Lin | H04L 25/0212 |

(Continued)

FOREIGN PATENT DOCUMENTS

| JP | WO2013190922 A1 | 5/2016 |
| WO | 2012060751 A1 | 5/2012 |

OTHER PUBLICATIONS

International Search Report and Written Opinion—PCT/US2020/030494 - ISA/EPO—dated Jul. 13, 2020.

*Primary Examiner* — Parth Patel
(74) *Attorney, Agent, or Firm* — Nerrie M. Zohn

(57) ABSTRACT

Channel estimation performance depends on the amount of averaging performed by a channel impulse response coherent filter. For half-duplex UEs, which use a single phase locked loop (PLL) for both downlink transmissions and uplink transmissions, averaging may not be performed across downlink subframes before and after uplink subframes if the PLL's phase changes and locks to a random initial value when switching transmission directions. Techniques disclosed herein facilitate estimating the PLL's random initial phase and enable correcting the phase of symbols accordingly. By correcting the phase of the symbols, it is possible to average across symbols before and after a frequency re-tune and/or a transmission direction switch based on the phase correction. This may serve to improve the accuracy of channel estimation. Further techniques disclosed herein may improve the accuracy of Doppler estimations by enabling the inclusion of symbols before and after a frequency re-tuning when performing the Doppler estimation.

29 Claims, 10 Drawing Sheets

(56) References Cited

U.S. PATENT DOCUMENTS

| | | | |
|---|---|---|---|
| 2004/0091026 A1* | 5/2004 | Nakayama | H04B 1/7113 375/148 |
| 2006/0193407 A1* | 8/2006 | Dibiaso | H04L 27/2273 375/343 |
| 2007/0211832 A1* | 9/2007 | Lee | H04L 25/023 375/340 |
| 2013/0029586 A1* | 1/2013 | Wang | H04L 27/2655 455/3.01 |
| 2013/0116957 A1* | 5/2013 | Qiu | H04L 27/2679 702/75 |
| 2013/0129006 A1* | 5/2013 | Kumar Reddy | H04L 5/00 375/295 |
| 2013/0250791 A1* | 9/2013 | Sugar | G01S 5/0221 370/252 |
| 2014/0254562 A1* | 9/2014 | Shim | H04W 56/00 370/335 |
| 2015/0085793 A1* | 3/2015 | Luo | H04L 5/0048 370/329 |
| 2016/0337105 A1* | 11/2016 | Lawton | H04L 1/0026 |
| 2017/0288810 A1* | 10/2017 | Kang | H04L 7/02 |
| 2018/0007667 A1* | 1/2018 | You | H04W 72/12 |
| 2018/0183643 A1* | 6/2018 | Kang | H04L 25/0226 |
| 2018/0317098 A1* | 11/2018 | Choi | H04L 27/2602 |
| 2019/0215122 A1* | 7/2019 | Gong | H04W 72/0413 |
| 2019/0260625 A1* | 8/2019 | Axmon | H04L 27/2647 |
| 2020/0137774 A1* | 4/2020 | Molisch | H04B 17/309 |
| 2020/0209378 A1* | 7/2020 | Yokev | H04W 72/1215 |
| 2020/0267039 A1* | 8/2020 | Scholand | H04L 5/0053 |
| 2020/0287754 A1* | 9/2020 | Stathakis | H04L 25/03 |
| 2020/0351124 A1* | 11/2020 | Babaheidarian | H04L 25/022 |
| 2020/0351847 A1* | 11/2020 | Kim | H04W 16/14 |

\* cited by examiner

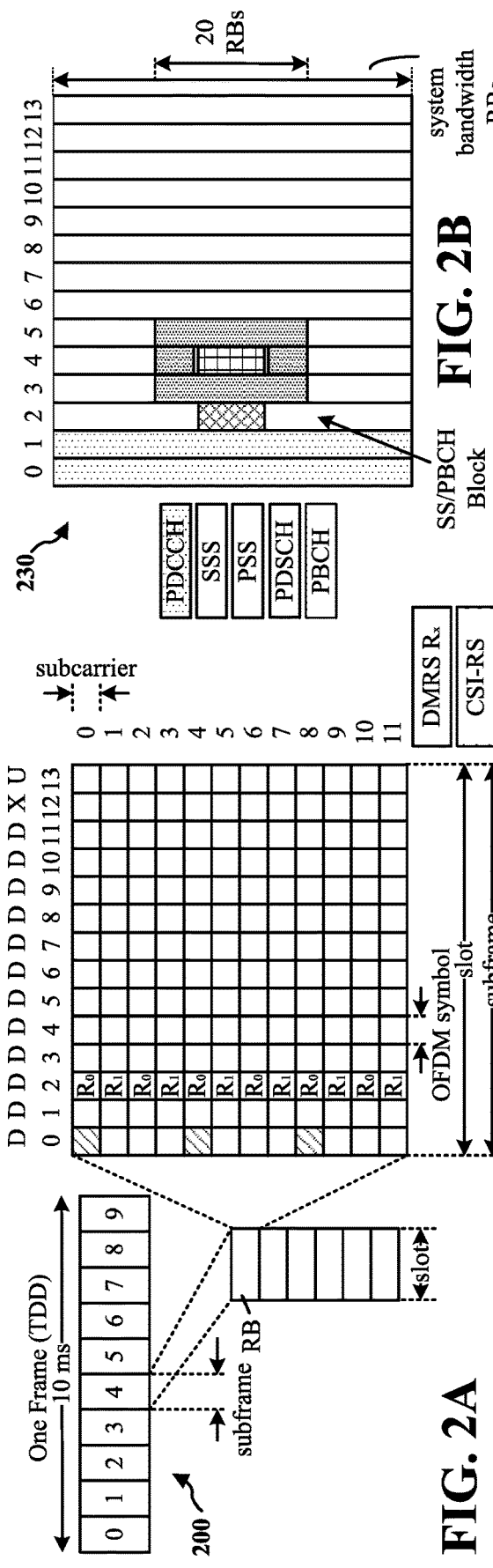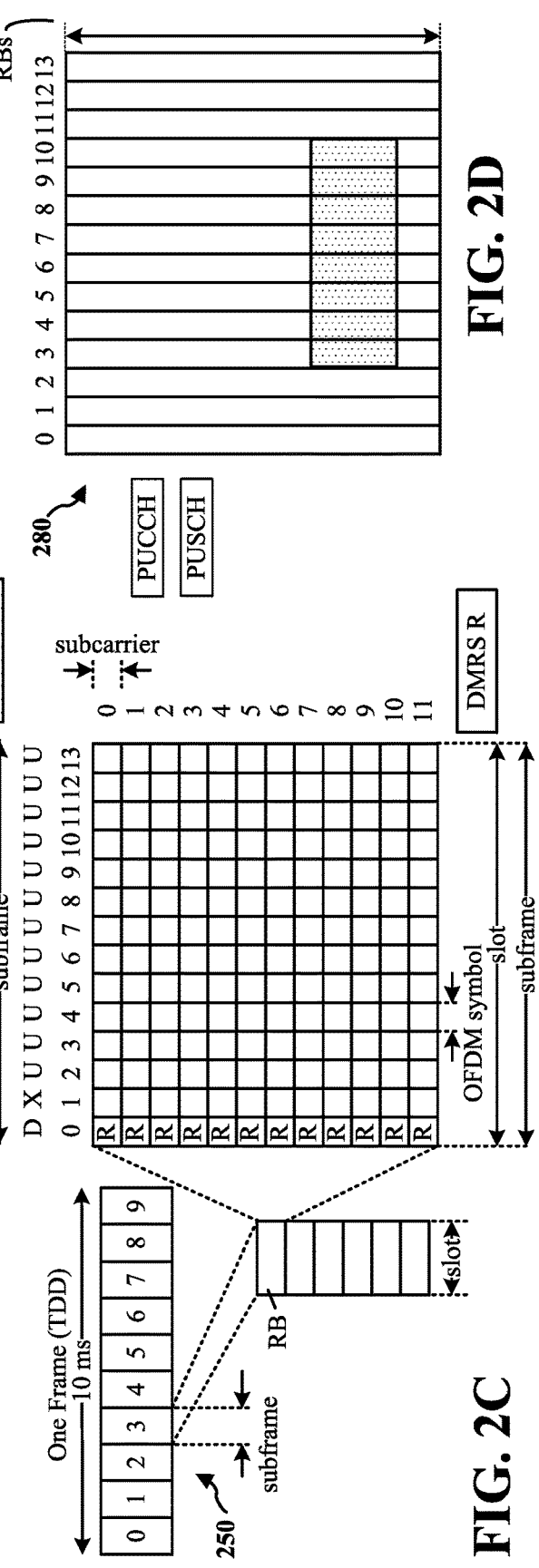
FIG. 2A  FIG. 2B  FIG. 2C  FIG. 2D

CHANNEL ESTIMATION FOR SYSTEMS WITH PLL PHASE DISCONTINUITIES

BACKGROUND

Technical Field

The present disclosure relates generally to communication systems, and more particularly, to wireless communication including channel estimation and/or Doppler estimation.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G/NR is part of a continuous mobile broadband evolution promulgated by Third Generation Partnership Project (3GPP) to meet new requirements associated with latency, reliability, security, scalability (e.g., with Internet of Things (IoT)), and other requirements. 5G/NR includes services associated with enhanced mobile broadband (eMBB), massive machine type communications (mMTC), and ultra reliable low latency communications (URLLC). Some aspects of 5G/NR may be based on the 4G Long Term Evolution (LTE) standard. There exists a need for further improvements in 5G/NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Channel estimation performance may depend on the amount of averaging performed by a channel impulse response (CIR) coherent filter. For a half-duplex UE, which uses a single phase locked loop (PLL) for both downlink transmissions and uplink transmissions, averaging may not be performed across downlink subframes before and after uplink subframes if the PLL's phase changes and locks to a random initial value when switching transmission directions (e.g., when switching from downlink transmission to uplink transmissions, or when switching from uplink transmission to downlink transmissions). In some examples, a bandwidth-reduced low-cost (BL) UE, which monitors a reduced bandwidth due to, for example, low complexity, averaging may not be performed when re-tuning occurs due to the PLL's random initial phase after each re-tune. Furthermore, in some examples, a BL UE or a half-duplex UE may reset the CIR coherent filter after switching to uplink transmissions and/or after a frequency re-tuning. However, by resetting the CIR coherent filter, the amount of averaging is reduced and, thus, channel estimation performance may also be reduced. Furthermore, in some examples, the CIR's phase may include information which may be used when performing Doppler estimation. However, a PLL's random initial phase may corrupt the Doppler information and, thus, may degrade the accuracy of the Doppler estimation and the performance of the channel estimation.

Techniques disclosed herein facilitate estimating the PLL's random initial phase and enable correcting the phase of symbols accordingly. By correcting the phase of the symbols, techniques disclosed herein enable averaging across symbols before and after a frequency re-tune and/or a transmission direction switch based on the phase correction. Thus, techniques presented herein may improve the accuracy of channel estimation. Furthermore, techniques disclosed herein may improve the accuracy of Doppler estimations by enabling the including of symbols before and after a frequency re-tuning when performing the Doppler estimation.

In an aspect of the disclosure, a method, a computer-readable medium, and an apparatus are provided. An example apparatus for wireless communication at a User Equipment (UE) receives a signal including a gap in time. In some examples, the gap corresponds to a position between a first set of symbols of the signal and a second set of symbols of the signal. In some examples, the first set of symbols and the second set of symbols each include a plurality of consecutive downlink symbols. The example apparatus also determines a phase correction based on a comparison of a first phase from at least one symbol before the gap and a second phase from at least one symbol after the gap. The example apparatus also applies the phase correction to the second set of symbols of the signal after the gap. The example apparatus also performs channel estimation using the first set of symbols of the signal before the gap and the second set of symbols of the signal after the gap after applying the phase correction to the second set of symbols.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
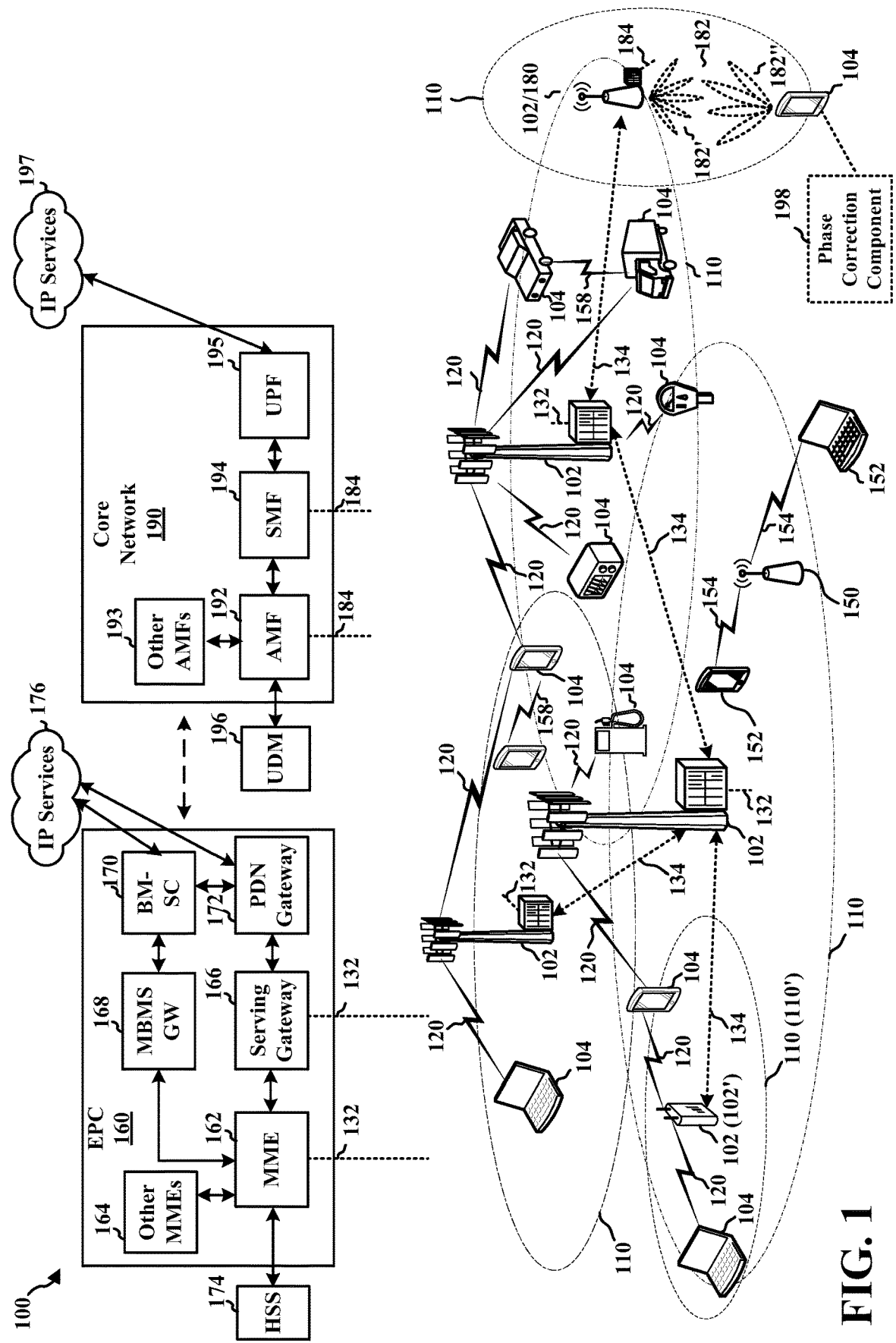
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" are used interchangeably.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G/NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz—300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to manage one or more aspects of wireless communication via performing channel estimation or Doppler estimation for systems with PLL phase discontinuities. For example, the UE 104 of FIG. 1 includes a phase correction component 198 configured to receive a signal including a gap in time, wherein the gap corresponds to a position between a first set of consecutive downlink symbols of the signal and a second set of consecutive symbols of the signal and to determine a phase correction based on a comparison of a first phase from at least one symbol of the first set of symbols before the gap and a second phase from at least one symbol of the second set of symbols after the gap. The gap may correspond to uplink subframe(s) or downlink subframe(s) having a different center frequency. The UE may apply the phase correction to the second set of symbols of the signal after the gap, and perform channel estimation and/or Doppler estimation using the first set of symbols of the signal before the gap and the second set of symbols of the signal after the gap after applying the phase correction to the second set of symbols.

Although the following description is focused on downlink communications, it should be appreciated that the concepts described herein may be applicable to uplink communications and/or sidelink communications. Furthermore, although the following description may be focused on 5G/NR, the concepts described herein may be applicable to other similar areas, such as LTE, LTE-A, CDMA, GSM, and/or other wireless technologies, in which a phase discontinuity of a signal may degrade the quality of channel estimations associated with that signal.

Furthermore, although the following description may be focused on bandwidth-reduced low-cost UEs (BL-UEs), the concepts described herein may be applicable to other UEs, such as single PLL UEs and/or coverage enhancement UEs (CE-UEs).

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A to 2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
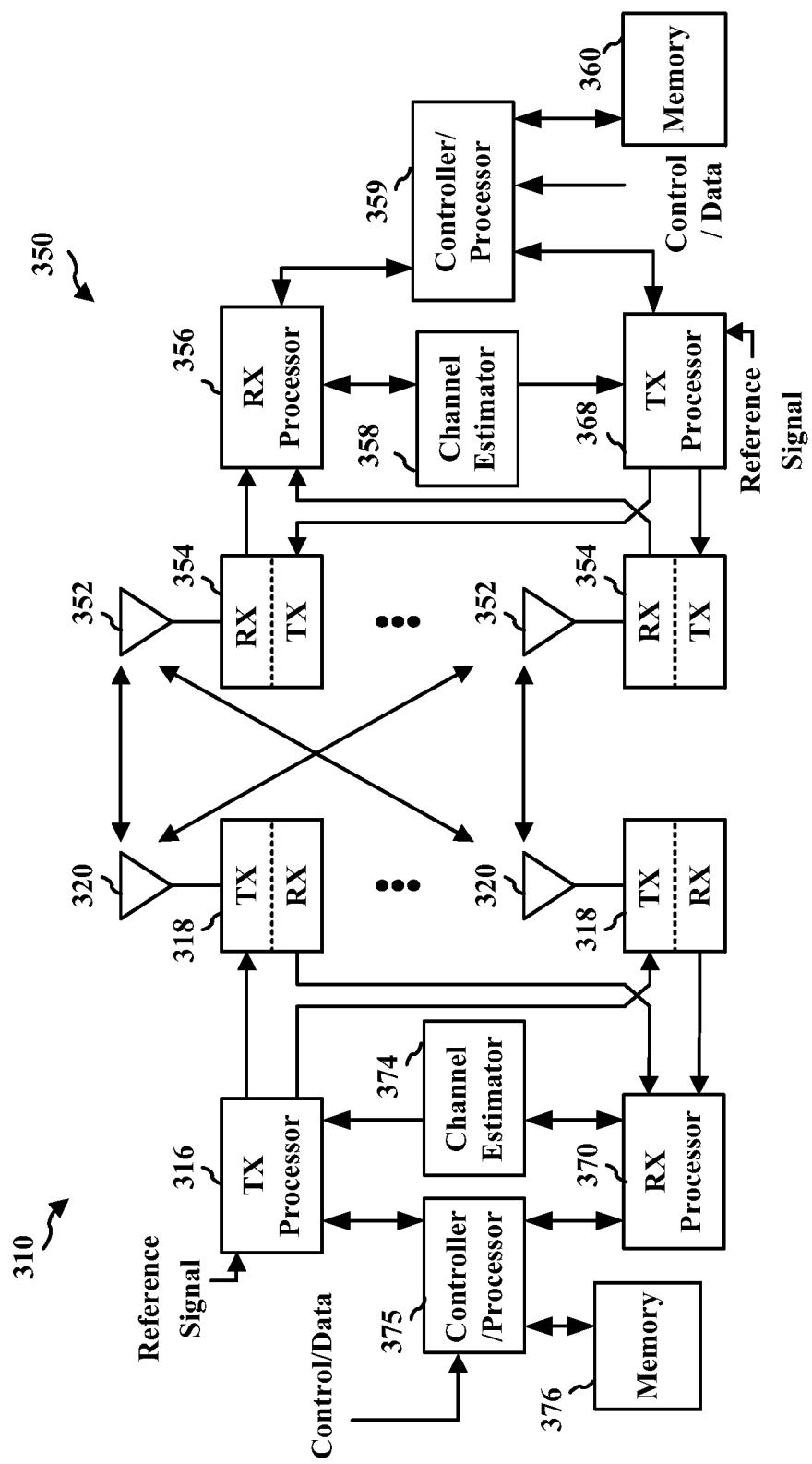
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and/or the controller/processor 359 may be configured to perform aspects in connection with the phase corrector 198 of FIG. 1.

Low complexity devices may use a single PLL to cover downlink transmissions and uplink transmission, but not to receive/transmit at the same time. In some such examples, the low complexity device may perform a re-tuning after switching between reception and transmission. Bandwidth-reduced low-cost devices may perform frequent frequency hopping. However, in some examples, after a re-tune or a frequency hop, the PLL may change and lock to a random initial phase value. As a result, the UE (e.g., the low complexity UE and/or the bandwidth-reduced low-cost UE) may reset the coherent filter because the initial phase of the symbols after the reset are random. However, as described above, channel estimation performance may depend on the amount of averaging performed by the coherent filter. That is, increasing the number of symbols that the coherent filter is able to average may enable reducing the effective of noise and, thus, may facilitate increasing the performance of the channel estimation. However, performing more frequent resets (e.g., due to switching transmission directions and/or due to frequency hopping) reduces the quantity of symbols that may be used for the averaging and, thus, may degrade the channel estimation. Furthermore, the CIR's phase may include information that can benefit Doppler estimation. A PLL's random initial phase corrupts this information and degrades the Doppler estimation accuracy. This corruption may then reduce channel estimation performance.

Thus, techniques are presented herein that may be used to improve the performance of channel estimations and/or Doppler estimation for low complexity devices (e.g., UEs with a single PLL) and for devices that perform frequent frequency hopping (e.g., BL-UEs and CE-UEs). For examples, techniques disclosed herein may reduce the likelihood of having to perform a reset by determining or estimating the initial PLL phase value following a re-tune or switching between downlink and uplink. That is, by estimating the random initial phase that may be applied by the PLL, techniques disclosed herein can correct for the random initial phase of the PLL. Thus, the device may use symbols received prior to the re-tune and after the re-tune to perform the averaging and improve the performance of the channel estimation.

When the gap between symbols before and after a re-tune is sufficiently small (e.g., 16*Ts, where Ts represents the sampling period), the accumulated phase due to the Doppler effect may be relatively small. As a result, the difference between the average phase of symbols before the re-tune and after the re-tune may be due to the random initial phase value of the PLL. Aspects disclosed herein enable determining a phase correction that may be applied to the symbols after the re-tune in order to reduce the impact of the PLL random initial phase and, thereby, increase the quantity of symbols that may be used by the coherent filter for performing the averaging. It should be appreciated that the term "gap" may refer to the time during which a BL/CE UE is switched to uplink transmissions or when a frequency re-tune to a different frequency is performed.

As an example, a BL/CE UE may have multiple center frequencies, e.g., based on frequency allocation. Thus, the UE may monitor a plurality of center frequencies. The UE may select a center frequency having the smallest gap duration due to uplink subframe(s) or downlink subframe(s) having a different center frequency. The PLL may apply the random initial phase to all consecutive symbols (e.g., cell specific reference signal (CRS) symbols). When the gap is sufficiently small, the changes in the phase (e.g., due to the PLL random initial phase) may be estimated by computing the difference between the average phase over the symbols in consecutive symbols before and after the gap.

Figure 4:
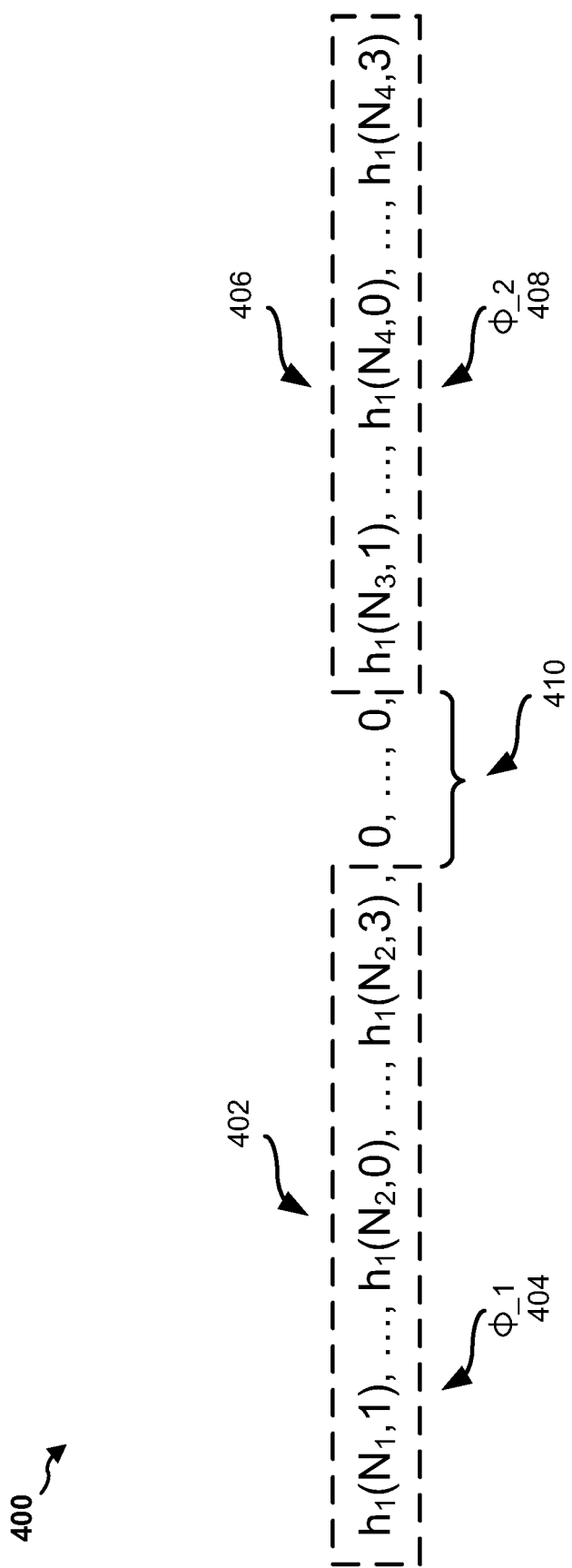
FIG. 4 illustrates an example signal represented by taps of symbols at different subframes.

FIG. 4 illustrates an example signal 400 represented by taps of the symbols at different subframes. For example, $h_i(n,t)$ represents the tap (i) of symbol (t) at subframe (n). In the illustrated example, symbols in subframes [N1, N2] and [N3, N4] are downlink symbols and have the same center frequency. As shown in FIG. 4, the signal 400 includes a first set of symbols 402 in subframes [N1, N2] and a second set of symbols 406 in subframes [N3, N4]. The first set of symbols 402 are positioned before a gap 410 and the second set of symbols 406 are positioned after the gap 410. The gap 410 may occur because of a change in transmission direction (e.g., the gap 410 corresponds to uplink subframes) and/or because of different center frequencies (e.g., the subframes [N1, N2] and [N3, N4] have a first center frequency and the subframe(s) between the subframes [N2] and [N3] have a second center frequency different than the first center frequency). It should be appreciated that the signal 400, including the first set of symbols 402 and the second set of symbols 406 correspond to an instance after a PLL is locked to a random initial phase value.

In the illustrated example, the UE may determine a first phase 404 for the symbols before the gap 410 and determine a second phase 408 for the symbols after the gap 410. For example, the UE may determine the first phase 404 by calculating an average phase of the symbols of the first set of symbols 402 before the gap 410. The UE may also determine the second phase 408 by calculating an average phase of the symbols of the second set of symbols 406 after the gap. The UE may then estimate the phase applied by the PLL as the difference between the second phase 408 and the first phase 404. For example, the UE may apply Equation 1 to estimate the phase applied by the PLL.

$$\theta = \varphi_2 - \varphi_1 \quad \text{(Equation 1)}$$

In Equation 1, above, the second phase ($\varphi_2$) represents the average phase of the symbols of the second set of symbols 406 after the gap, the first phase ($\varphi_1$) represents the average phase of the symbols of the first set of symbols 402 before the gap, and the difference ($\theta$) represents the phase applied by the PLL of the UE.

In some examples, the average phase of the symbols before the gap may be calculated using Equation 2.

$$\phi_1 = \mathbb{E}_{\substack{n \in [N_1, N_2] \\ t \in [0,3]}}(n, t)[\angle h_1(n, t)] \quad \text{(Equation 2)}$$

In Equation 2 (above), $\mathbb{E}_{t \in [0,3]}^{n \in [N1, N2]}$ represents the expectation over symbols in time, where (t)=0, 1, 2, or 3 and represents the symbol index, and (n) represents the subframe index. In Equation 2, the subframe [N1] represents the beginning of the set of symbols before the gap 410. Furthermore, as shown in Equation 2, the first phase 404 is not an average over the whole signal 400, but of the phase of the symbols of the first set of symbols 402 of the signal 400.

In some examples, the average of the symbols after the gap may be calculated using Equation 3.

$$\phi_2 = \mathbb{E}_{\substack{n \in [N_3, N_4] \\ t \in [0,3]}}(n, t)[\angle h_1(n, t)] \quad \text{(Equation 3)}$$

In Equation 3 (above), similar to in Equation 2, $\mathbb{E}_{t \in [0,3]}^{n \in [N3, N4]}$ represents the expectation over symbols in time, where (t)=0, 1, 2, or 3 and represents the symbol index, and (n) represents the subframe index. In Equation 3, the subframe [N4] represents the end of the set of symbols after the gap 410. Furthermore, as shown in Equation 3, the second phase 408 is not an average over the whole signal 400, but of the phase of the symbols of the second set of symbols 406 of the signal 400. It should be appreciated that in some examples, the first symbol after the gap may be excluded from the averaging.

In some examples, after the UE calculates the first phase 404 (e.g. by using Equation 2) and calculates the second phase 408 (e.g., by using Equation 3), the UE calculate the phase difference ($\theta$) by using Equation 1 (above).

In some examples, the UE may then apply Equation 4 to the symbols after the gap 410 (e.g., the second set of symbols 406) to correct the phase.

$$\hat{h}_i(n,t) = h_i(n,t)e^{-j\theta}, n \in [N3, N4], t \in [0,3] \quad \text{(Equation 4)}$$

In Equation 4 (above), $h_i(n,t)$ represents the symbols after the gap 410 (e.g., the symbols of the subframes [N3, N4]), $e^{-j\theta}$ represents the phase correction applied, (n) represents the subframe index, (t)=0, 1, 2, or 3 and represents the symbol index, and $\hat{h}_i(n,t)$ represents the phase-corrected symbols.

As described above, in some examples, the CIR coherent filter that may be used for channel estimation may be reset after each re-tune (or frequency hop) due to the random initial phase value of the PLL. However, by applying the phase correction disclosed herein, the resetting of the CIR coherent filter may be avoided and the amount of averaging applied by the CIR coherent filter may be increased.

Figure 5:
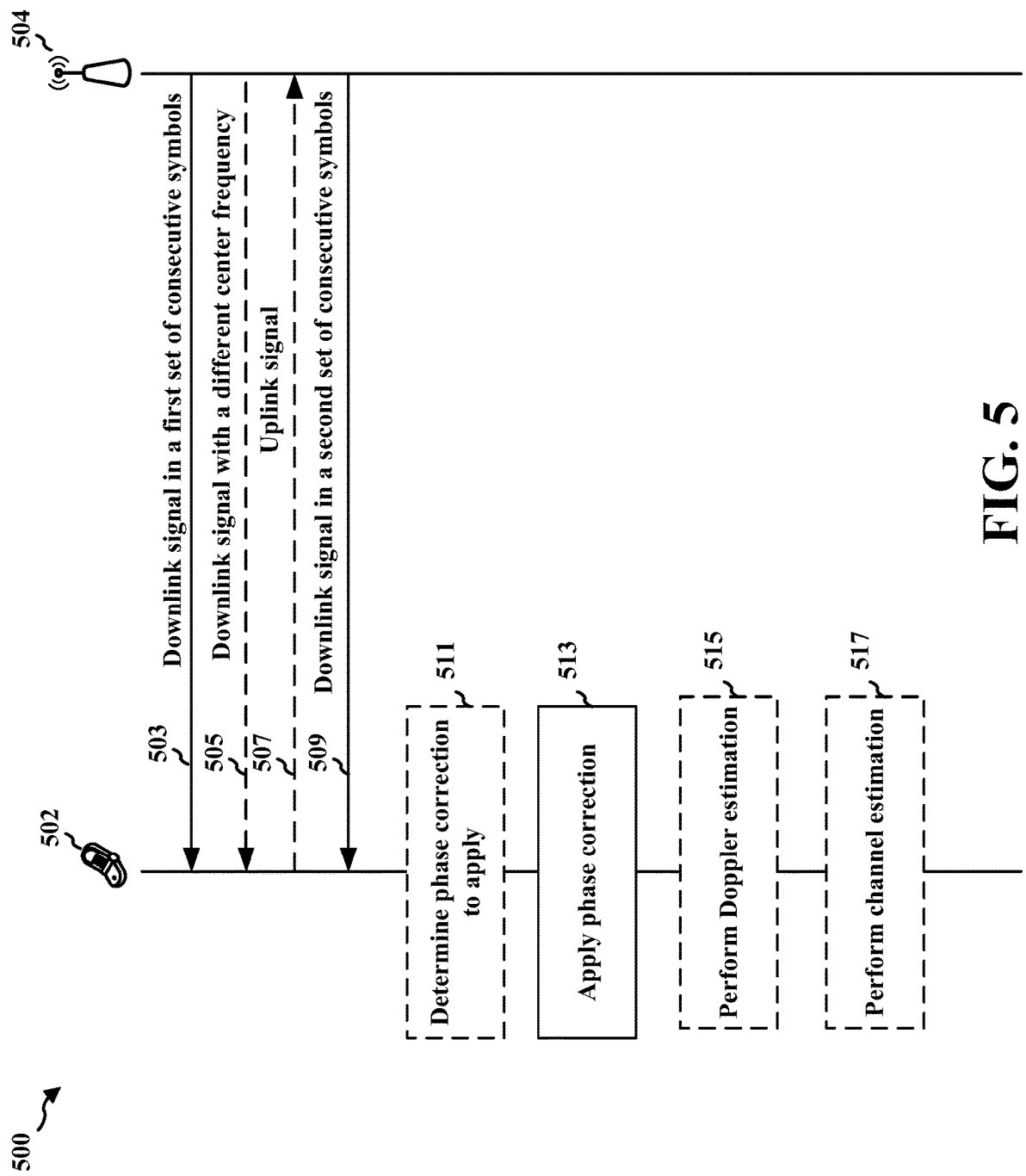
FIG. 5 is an example communication flow between a UE and a base station.

FIG. 5 illustrates an example of wireless communication 500 between a UE 502 and a base station 504, as presented herein. The UE may receive a downlink signal 503 in a first set of consecutive downlink symbols and a downlink signal 509 in a second set of consecutive downlink symbols. Downlink signals 503 and 509 may have the same center frequency. The UE may experience a gap between reception of signal 503 and signal 509. The gap may be due to reception of a downlink signal 505 that has a different center frequency than signals 503, 509. Thus, following reception of signal 505, the UE 502 may need to re-tune based on the different center frequency. In another example, the gap between signals 503 and 509 may be due to the UE switching from reception to transmission of an uplink signal 507 during uplink subframe(s). As described in connection with FIG. 4, the UE may apply a phase correction, at 513, to the symbols of the downlink signal 509 received following the gap. The UE may use the phase corrected signal to perform Doppler estimation, at 515, and/or to perform channel estimation, at 517.

As an illustrative example, consider an implementation in which the UE performs a re-tune every two subframes. In certain such examples, the CIR coherent filter may reset every two subframes. In an environment where the signal experiences a relatively low Doppler effect and relatively low signal-to-ratio (SNR), the CIR coherent filter may average six symbols. In contrast, when the disclosed phase correction is applied, the CIR coherent filter may average ten symbols, which may result in a throughput gain of 2.2 dB (e.g., 10*log(10/6)=2.2 dB). It should be appreciated that the variance of the residual noise after filtering may be inversely proportional to the length of averaging.

In some examples, employing the disclosed phase correction techniques may also improve Doppler estimation. For example, the phase of a signal may carry information about the Doppler (e.g., SNR). However, when the signal is randomly rotated (e.g., by the PLL applying a random initial phase to the signal), the information about the Doppler may be lost. Thus, by applying the phase correction to the rotated signal, the information about the Doppler is retained (or recovered) and may improve Doppler estimation. For example, when using a Whittle approximation for estimating Doppler, the quantity of symbols impacts the accuracy of the approximation. By applying the disclosed phase correction, the quantity of symbols used by the approximation may be increased and, thereby, improving the accuracy of the estimation.

As described above, in some examples, when the gap between the symbols is smaller, then the accumulated phase due to the Doppler effect may be smaller and the difference between the second phase and the first phase may be mainly due to the random initial phase value of the PLL. Thus, in some examples, the UE may apply the disclosed phase correction when the size of the gap of a selected center frequency satisfies a size threshold (e.g., the size of the gap is less than or equal to the size threshold). Thus, as illustrated at 511 in FIG. 5, the UE may determine the phase correction to be applied (e.g., the determination may be based on a size of the gap).

However, in some examples, the SNR of the signal may be relatively high (e.g., greater than or equal to an SNR threshold), and the difference between the second phase and the first phase may be mainly due to the accumulation of Doppler and the PLL's random initial phase. Furthermore, the respective phases of the symbols before the gap and after the gap may be relatively volatile (e.g., not consistent).

Figure 6:
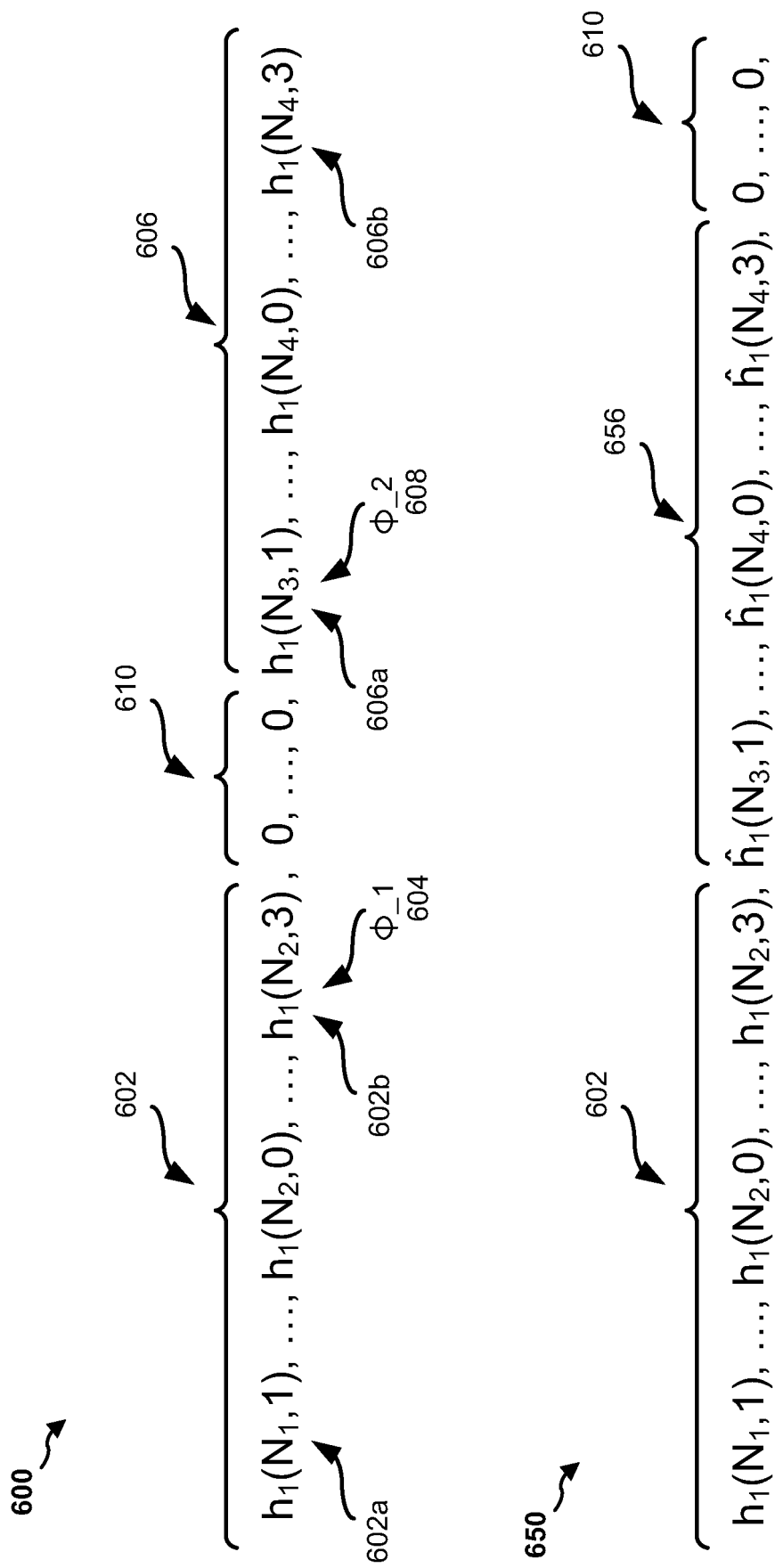
FIG. 6 illustrates another example signal represented by taps of symbols at different subframes.

FIG. 6 illustrates an example signal 600 represented by taps of the symbols at different subframes. In the illustrated example, symbols in subframes [N1, N2] and [N3, N4] are downlink symbols and have the same center frequency. As shown in FIG. 6, and similar to the signal 400 of FIG. 4, the signal 600 includes a first set of symbols 602 in subframes [N1, N2] and a second set of symbols 606 in subframes [N3, N4]. The first set of symbols 602 are positioned before a gap 610 and the second set of symbols 606 are positioned after the gap 610. The gap 610 may occur because of a change in transmission direction (e.g., the gap 610 corresponds to uplink subframes) and/or because of different center frequencies (e.g., the subframes [N1, N2] and [N3, N4] have a first center frequency and the subframe(s) between the subframes [N2] and [N3] have a second center frequency different than the first center frequency).

In the illustrated example, the UE may determine that the signal 600 has a relatively high SNR (e.g., the SNR of the signal 600 is greater than or equal to 10 dB). In some examples in which the SNR of the signal is relatively high, the UE may determine a phase correction based on a difference in phase between a symbol of the first set of symbols 602 and a symbol of the second set of symbols 606. For example, the UE may determine a phase correction based on a difference in phase between the last symbol of the first of symbols 602 and the first symbol of the second set of symbols 606. It should be appreciated that the SNR of the signal may correspond to a position before the gap 610 or a position after the gap 610.

In the illustrated example, the first set of symbols 602 includes a plurality of consecutive symbols including a first symbol 602a and a last symbol 602b, and the second set of symbols 606 includes a plurality of consecutive symbols including a first symbol 606a and a last symbol 606b. In some examples, each of the symbols of the first set of symbols 602 and the second set of symbols 606 may be associated with a respective phase. To determine the phase correction for the signal 600, the UE may determine a first phase 604 based on the phase of the last symbol 602b of the first set of symbols 602 before the gap 610. The UE may also determine a second phase 608 based on the phase of the first symbol 606a of the second set of symbols 606 after the gap 610.

In some examples, the UE may apply Equation 1 (reproduced below) to determine the phase difference.

$$\theta = \varphi_2 - \varphi_1 \quad \text{(Equation 1)}$$

In Equation 1, above, the second phase ($\varphi_2$) corresponds to the phase 608 of the first symbol 606a of the second set of symbols 606, the first phase ($\varphi_1$) corresponds to the phase 604 of the last symbol 602b of the first set of symbols 602, and the phase difference ($\theta$) represents the difference in phases of the two symbols.

In some examples, the UE may then rotate the symbols after the gap 610 (e.g., the symbols of the second set of symbols 606) based on the phase difference ($\theta$). For example, the UE may apply Equation 4 (reproduced below) to the symbols after the gap 610 (e.g., the second set of symbols 406) to rotate the respective phases.

$$\hat{h}_i(n,t) = h_i(n,t) e^{-j\theta}, n \in [N3, N4], t \in [0,3] \quad \text{(Equation 4)}$$

In Equation 4 (above), $h_i(n,t)$ represents the symbols after the gap 610 (e.g., the symbols of the subframes [N3, N4]), $e^{-j\theta}$ represents the phase correction applied, (n) represents the subframe index, (t)=0, 1, 2, or 3 and represents the symbol index, and $\hat{h}_i(n,t)$ represents the phase-corrected symbols.

In some examples, the UE may then rearrange the symbols of the signal so that the signal may be processed as a continuous signal, without a gap. For example, signal 650 represents the signal 600 after the UE has rearranged the symbols. For example, in the illustrated example, the UE has positioned a set of phase-corrected symbols 656 between the first set of symbols 602 and the gap 610. In the illustrated example, the set of phase-corrected symbols 656 may correspond to the second set of symbols 606 of the signal 600 after the UE rotated the phases of the respective symbols. In this manner, the symbols of the signal 650 associated with the same center frequency (e.g., the subframes [N1, N2, N3, N4] may be processed as a continuous signal rather than as a signal with gap(s) (e.g., the gap 610) between any of the symbols. That is, the UE may process the signal 650 by processing the first set of symbols 602, followed by the second set of symbols 606, and then followed by the gap 610. However, it should be appreciated that in some examples, rather than rearranging the symbols, the UE may process the symbols as though there were no gap.

As described above, in some examples in which the signal has a relatively high SNR (e.g., greater than or equal to an SNR threshold), changes in the phases of the symbols may be mainly due to the Doppler effect. By shifting the phases of the symbols after the gap back based on a phase of a symbol before the gap, the UE undoes the phase shift due to the Doppler effect and due to the random initial phase value of the PLL. For gaps that are relatively small (e.g., the size of the gap is less than or equal to the size threshold), the change in magnitude of the signal during the gap may be negligible and, thus, after the phase correction is applied, the UE may process the rearranged symbols as a consecutive signal.

Figure 7:
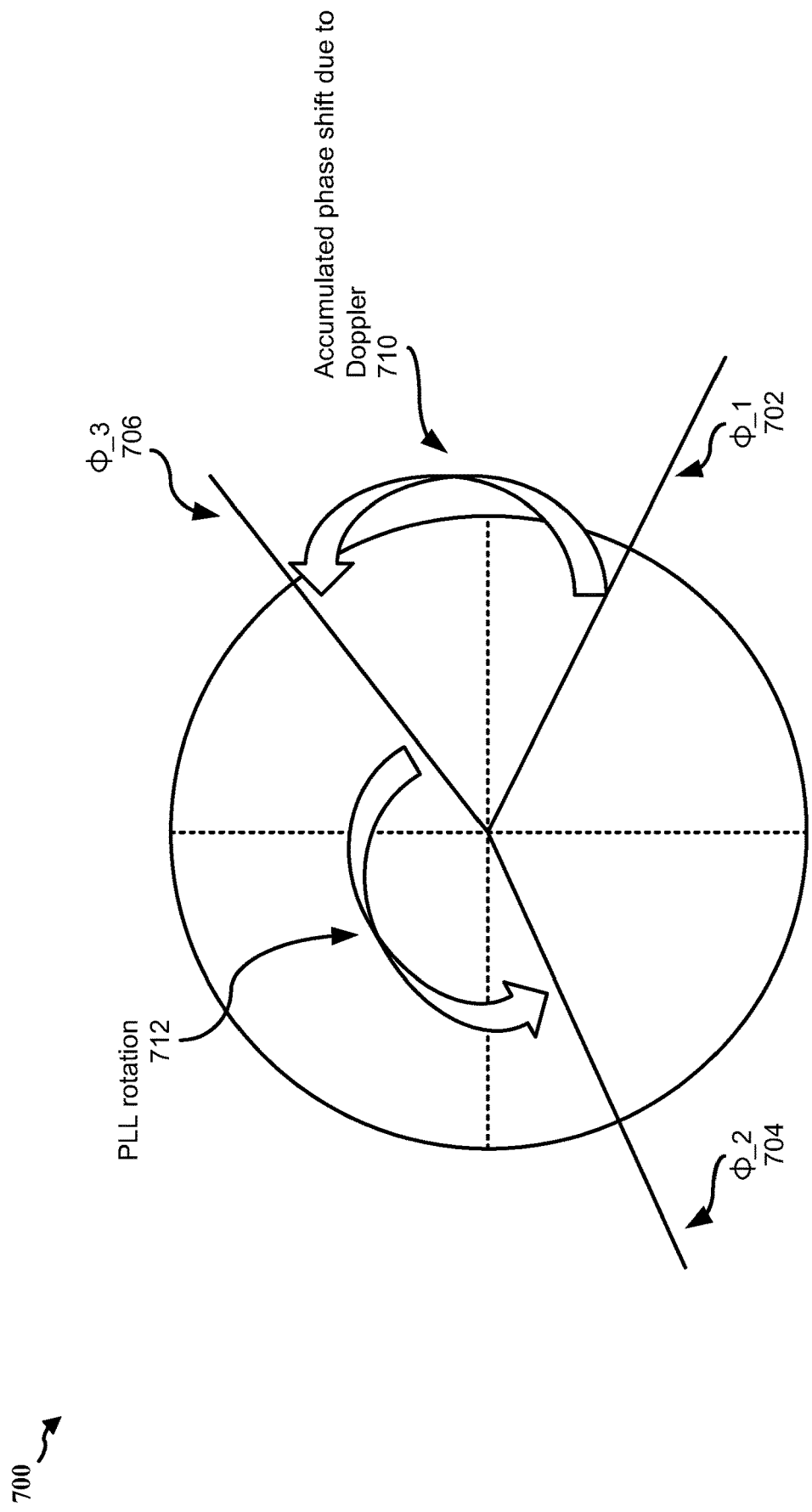
FIG. 7 illustrates an example representation of phase shift for a signal with relatively high SNR.

FIG. 7 illustrates an example representation 700 of phase shift for a signal with relatively high SNR. The representation 700 includes a first phase 702 associated with a last symbol of a first set of symbols before a gap (e.g., the last symbol 602b of the first set of symbols 602 of FIG. 6) and a second phase 704 associated with a first symbol of a second set of symbols after a gap (e.g., the first symbol 606a of the second set of symbols 606 of FIG. 6). The representation 700 also includes a third phase 706 that illustrates a phase shift due to the Doppler effect (e.g., due to an accumulated Doppler phase shift 710). The representation 700 also includes a PLL rotation 712 that may correspond to the random initial phase value of the PLL.

As shown in FIG. 7, by calculating the phase difference ($\theta$) between the second phase 704 and the first phase 702, and rotating the symbols after the gap based on the phase difference ($\theta$), the UE can remove the phase shift due to the Doppler effect (e.g., the accumulated Doppler phase 710) and due to the random initial phase value of the PLL (e.g., the PLL rotation 712).

It should be appreciated that techniques disclosed herein enable improved accuracy of channel estimations and/or Doppler estimations for systems with PLL phase discontinuities (e.g., due to frequent frequency hopping in BL-UEs and/or due to uplink subframes in single PLL UEs). Due to the random initial phase value of the PLL after each re-tune, Doppler estimation accuracy may be degraded. Furthermore, the CIR coherent filter used for channel estimations may need to be reset after each re-tune, resulting in fewer symbols being used by the CIR coherent filter for averaging.

The techniques disclosed herein help to improve the performance of channel estimations for signals with relatively high SNR and for signals with relatively low SNR. For example, the UE may calculate a phase difference between a phase associated with one or more symbols after the gap and a phase associated with one or more symbols before the gap. The UE may then apply the phase difference to the symbols after the gap to rotate those respective symbols.

In some examples in which the SNR is relatively high (e.g., when the SNR of the signal satisfies the SNR threshold (e.g., is greater than or equal to the SNR threshold)), the UE may determine the first phase as the phase associated with the last symbol before the gap, and may determine the second phase as the phase associated with the first symbol after the gap. The UE may then rotate the symbols after the gap based on the phase difference between the second phase and the first phase, and then rearrange the symbols so that the symbols of the signal may be processed as a continuous signal.

In some examples in which the SNR is not relatively high (e.g., when the SNR of the signal does not satisfy the SNR threshold (e.g., is less than the SNR threshold)), the UE may determine the first phase as an average of a plurality of consecutive symbols before the gap, and may determine the second phase as an average of a plurality of consecutive symbols after the gap. In some examples, the second phase may be based on a subset of the plurality of consecutive symbols after the gap. The UE may then apply the phase difference between the second phase and the first phase to the symbols after the gap.

Figure 8:
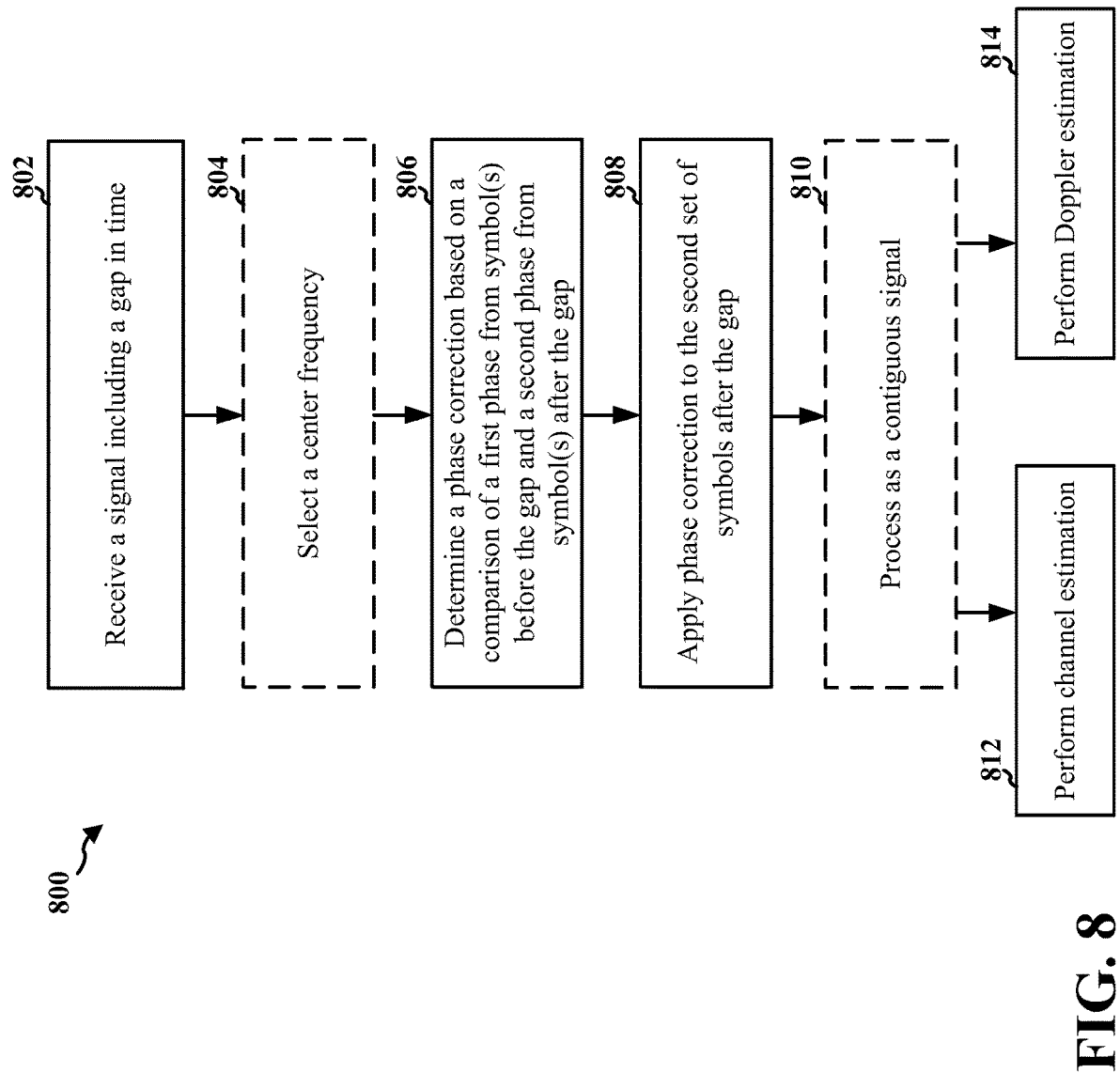
FIG. 8 is a flowchart of a method of wireless communication.

FIG. 8 is a flowchart 800 of a method of wireless communication. The method may be performed by a UE (e.g., the UE 104, 350; the apparatus 902/902'; the processing system 1014, which may include the memory 360 and which may be the entire UE 350 or a component of the UE 350, such as the TX processor 368, the RX processor 356, and/or the controller/processor 359. The method may enable a UE or other wireless device to perform more accurate channel estimation and/or Doppler estimation. Optional aspects are illustrated with a dashed line.

At 802, the UE receives a signal including a gap in time. The signal may be received by reception component 904 in apparatus 902. The gap corresponds to a position in time between a first set of symbols of the signal and a second set of symbols of the signal. The first set of symbols includes a first plurality of consecutive downlink symbols. The first set of symbols and the second set of consecutive symbols may share a center frequency. The second set of symbols includes a second plurality of consecutive symbols. The gap may correspond to uplink subframes, such as uplink transmissions in half-duplex systems. FIG. 5 illustrates an example uplink signal 507 between the two sets of downlink signals 503, 509. Alternately, the gap may correspond to downlink subframes with a different center frequency than the first set of symbols and/or the second set of symbols. FIG. 5 illustrates an example downlink signal 505 having a different center frequency that is received between the two sets of downlink signals 503, 509 having a shared center frequency.

It should be appreciated that the UE may select (or determine) the first set of symbols and the second set of symbols after the PLL is locked to a random initial phase value.

As illustrated at 810, the UE may process the signal as a continuous signal by rearranging the positioning of the first symbol of the second set of symbols to a position next to the last symbol of the first set of symbols. In some examples, the UE may perform the processing of the signal as a continuous signal when the SNR of the signal is relatively high. The processing may be performed by signal processing component 916 in apparatus 902. Thus, the UE may process the signal without the gap through rearrangement of the position of the second set of symbols relative to the first set of symbols.

As illustrated at 804, the UE may select a center frequency, from a plurality of center frequencies associated with the signal. The selection may be performed by selection component 918 in apparatus 902. The center frequency may be selected based on a size of the gap associated with the center frequency. The first set of symbols, the second set of symbols, and the gap may correspond to symbols associated with the selected center frequency. The size of the gap associated with the selected center frequency corresponds to the smallest gap of the respective gaps of the plurality of center frequencies.

At 806, the UE determines a phase correction based on a comparison of a first phase from at least one symbol of the first set of symbols before the gap and a second phase from at least one symbol of the second set of symbols after the gap. The phase correction may be determined in the manner described in connection with any of FIGS. 4 to 7. The phase correction may be determined by determination component 910 in apparatus 902. The phase correction may be based on a difference between the second phase and the first phase. The first phase may correspond to a first average phase of the symbols of the first set of symbols, the second phase may correspond to a second average phase of a subset of the symbols of the second set of symbols. The subset of the symbols of the second set of symbols might not include the first symbol of the second set of symbols. However, it should be appreciated that since the UE is processing the signal after the PLL is locked, the second phase may correspond to a second average phase of the symbols of the second set of symbols, rather than a subset of the symbols of the second set of symbols. In this example, the phase correction may be based on a difference between the second phase and the first phase. As illustrated at 511 in FIG. 5, the UE may determine a type of phase correction to determine/apply. As an example, the phase correction may be determined based at least in part on an SNR associated with the signal. The phase correction may be determined when a parameter is met (e.g., when a size of the gap satisfies a size threshold).

At 808, the UE applies the phase correction to the second set of symbols of the signal after the gap. The phase correction may be applied by phase correction component 904 in apparatus 912. After applying the phase correction to the second signal at 808, the UE performs channel estimation or Doppler estimation using the first set of symbols of the signal before the gap and the second set of symbols of the signal after the gap.

For example, the first phase may be associated with the last symbol of the first set of symbols, and the second phase may be associated with the first symbol of the second set of symbols. When the SNR exceeds a threshold SNR, the phase correction may be based on a difference between the second phase and the first phase. This enables the phase correction to be applied for high SNR (e.g., to address phase shift due to the Doppler effect).

The first phase may be associated with a first average phase of the symbols of the first set of symbols, and the second phase may be associated with a second average phase of a subset of symbols of the second set of symbols. The subset of symbols might not include the first symbol of the second set of symbols.

For example, at 812, the UE may perform channel estimation using the first set of symbols of the signal before the gap and the second set of symbols of the signal after the gap after applying the phase correction to the second set of symbols, at 808. The channel estimation may be performed by channel estimation component 912 in apparatus 902. For center frequency hopping and low-cost half-duplex systems, the accuracy of channel estimation may be improved by performing the channel estimation after applying the phase correction to the symbols following the gap. For example, the UE may perform CIR averaging over both sets of symbols after applying the phase correction to the symbols following the gap.

At 814, the UE may perform the Doppler estimation using the second set of symbols of the signal after the gap after applying the phase correction to the second set of symbols. The Doppler estimation may be performed by Doppler estimation component 914 in apparatus 902. Similar to channel estimation, Doppler estimation may be improved by performing the Doppler estimation after applying the phase correction to the symbols following the gap. For example, Doppler estimation may be improved by the UE using both sets of symbols after applying the phase correction to the symbols following the gap for the Doppler estimation.

Figure 9:
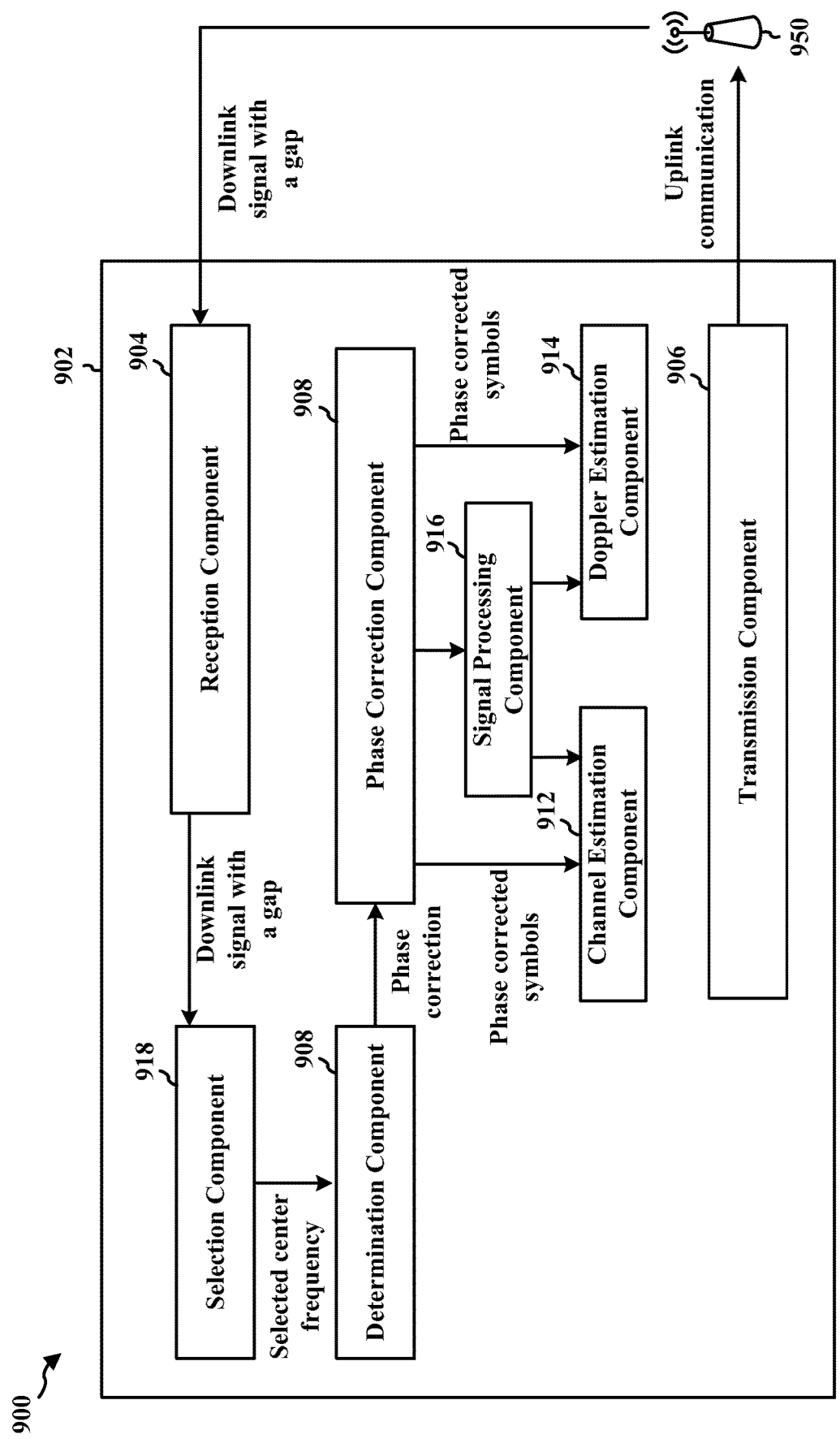
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a UE or a component of a UE. The apparatus includes a reception component 904 that receives downlink communication from a base station. For example, the reception component 904 may be configured to receive a signal including a gap in time, wherein the gap corresponds to a position between a first set of symbols of the signal and a second set of symbols of the signal, wherein the first set of symbols includes a first plurality of consecutive symbols including a respective first symbol and a respective last symbol, and the second set of symbols includes a second plurality of consecutive symbols including a respective first symbol and a respective last symbol (e.g., as described in connection with 802). The apparatus includes a transmission component 906, e.g., that transmits uplink communication to a base station. The apparatus may include a determination component 908 configured to determine a phase correction based on a comparison of a first phase from at least one symbol of the first set of symbols before the gap and a second phase from at least one symbol of the second set of symbols after the gap (e.g., as described in connection with 806 in the flowchart in FIG. 8). The apparatus may include a phase correction component 910 configured to apply the phase correction to the second set of symbols of the signal after the gap (e.g., as described in connection with 808 in the flowchart in FIG. 8).

The apparatus may include a channel estimation component 912 configured to perform channel estimation using the first set of symbols of the signal before the gap and the second set of symbols of the signal after the gap after applying the phase correction to the second set of symbols (e.g., as described in connection with 812 in the flowchart in FIG. 8).

The apparatus may include a Doppler estimation component 914 configured to perform Doppler estimation using the first set of symbols of the signal before the gap and the second set of symbols of the signal after the gap after applying the phase correction to the second set of symbols (e.g., as described in connection with 814 in the flowchart in FIG. 8).

The apparatus may include a signal processing component 916 configured to process the signal as a continuous signal by rearranging the positioning of the first symbol of the second set of symbols to a position next to the last symbol of the first set of symbols (e.g., as described in connection with 810 in the flowchart in FIG. 8).

The apparatus may include a selection component 918 configured to select a center frequency, from a plurality of center frequencies associated with the signal, based on a size of the gap associated with the center frequency, wherein the first set of symbols, the second set of symbols, and the gap correspond to symbols associated with the selected center frequency (e.g., as described in connection with 804 in the flowchart in FIG. 8).

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
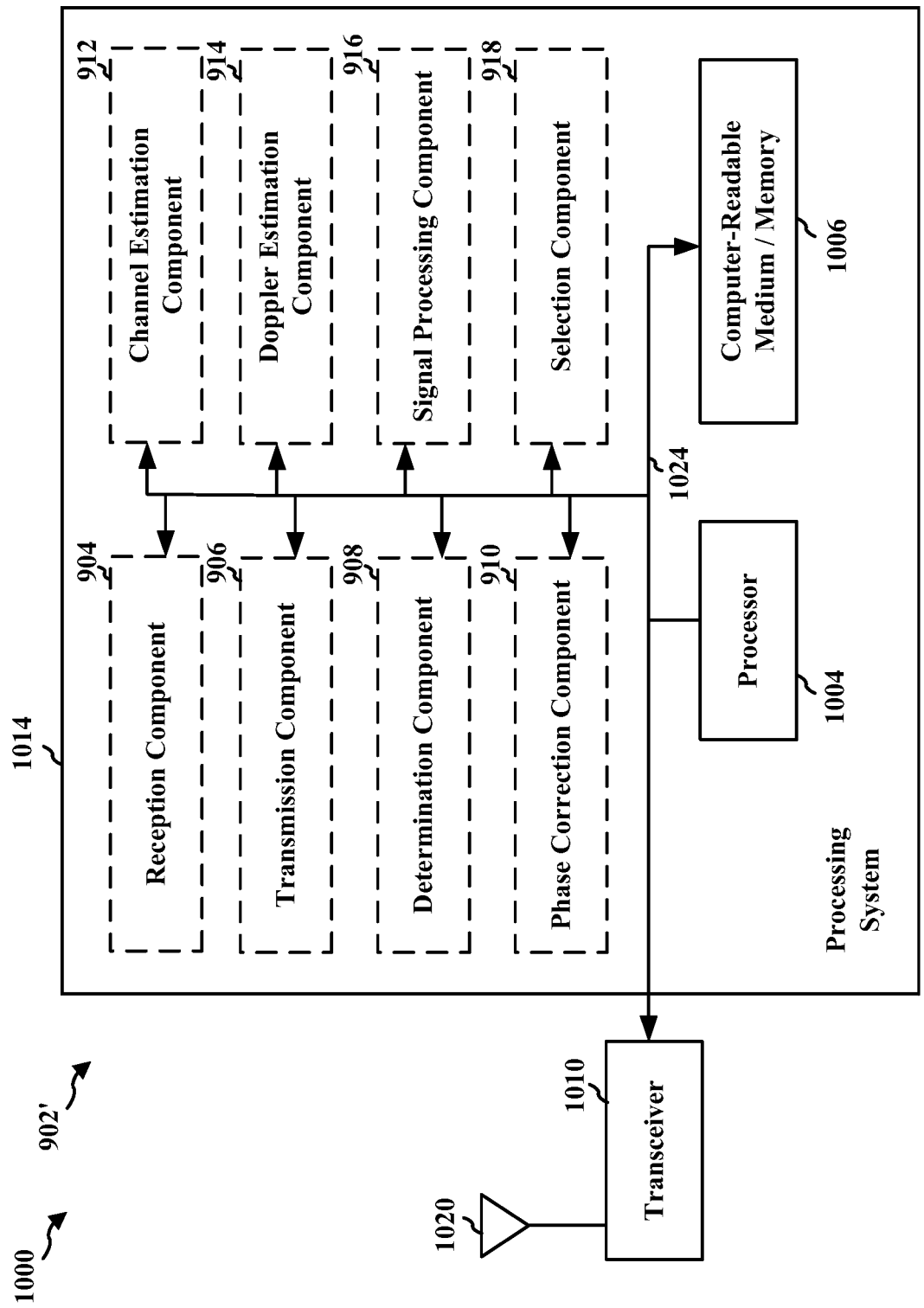
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, 916, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914, 916. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359. Alternatively, the processing system 1014 may be the entire UE (e.g., see 350 of FIG. 3).

In one configuration, the apparatus 902/902' for wireless communication includes means for receiving a signal including a gap in time, wherein the gap corresponds to a position between a first set of symbols of the signal and a second set of symbols of the signal, where the first set of symbols includes a first plurality of consecutive symbols including a respective first symbol and a respective last symbol, and the second set of symbols includes a second plurality of consecutive symbols including a respective first symbol and a respective last symbol (e.g., as described in connection with 802 in the flowchart in FIG. 8). The apparatus may include means for determining a phase correction based on a comparison of a first phase from at least one symbol of the first set of symbols before the gap and a second phase from at least one symbol of the second set of symbols after the gap (e.g., as described in connection with 806 in the flowchart in FIG. 8). The apparatus may include means for applying the phase correction to the second set of symbols of the signal after the gap (e.g., as described in connection with 808 in the flowchart in FIG. 8). The apparatus may include means for performing channel estimation using the second set of symbols of the signal after the gap after applying the phase correction to the second set of symbols (e.g., as described in connection with 812 in the flowchart in FIG. 8). The apparatus may include means for performing Doppler estimation using the second set of symbols of the signal after the gap after applying the phase correction to the second set of symbols (e.g., as described in connection with 814 in the flowchart in FIG. 8). The apparatus may include a signal processing component 916 configured means for processing the positioning of the first symbol of the second set of symbols to a position next to the last symbol of the first set of symbols (e.g., as described in connection with 810 in the flowchart in FIG. 8). The apparatus may include means for selecting a center frequency, from a plurality of center frequencies associated with the signal, based on a size of the gap associated with the center frequency, wherein the first set of symbols, the second set of symbols, and the gap correspond to symbols associated with the selected center frequency (e.g., as described in connection with 804 in the flowchart in FIG. 8). The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It should be appreciated that techniques disclosed herein enable improving the performance of channel estimations for systems with PLL phase discontinuities (e.g., due to frequent frequency hopping in BL-UEs and/or due to uplink subframes in single PLL UEs). Due to the random initial phase value of the PLL after each re-tune, Doppler estimation accuracy may be degraded. Furthermore, the CIR coherent filter used for channel estimations may need to be reset after each re-tune, resulting in fewer symbols being used by the CIR coherent filter for averaging.

The techniques disclosed herein describe improving the performance of channel estimations for signals with relatively high SNR and for signals with relatively low SNR. For example, the UE may calculate a phase difference between a phase associated with one or more symbols after the gap and a phase associated with one or more symbols before the gap. The UE may then apply the phase difference to the symbols after the gap to rotate those respective symbols.

In some examples in which the SNR is relatively high (e.g., when the SNR of the signal satisfies the SNR threshold, such as when the SNR of the signal is greater than or equal to the SNR threshold), the UE may determine the first phase as the phase associated with the last symbol before the gap, and may determine the second phase as the phase associated with the first symbol after the gap. The UE may then rotate the symbols after the gap based on the phase difference between the second phase and the first phase, and then rearrange the symbols so that the symbols of the signal may be processed as a continuous signal.

In some examples in which the SNR is not relatively high (e.g., when the SNR of the signal does not satisfy the SNR threshold, such as when the SNR of the signal is less than the SNR threshold), the UE may determine the first phase as an average of a plurality of consecutive symbols before the gap, and may determine the second phase as an average of a plurality of consecutive symbols after the gap. In some examples, the second phase may be based on a subset of the plurality of consecutive symbols after the gap. The UE may then apply the phase difference between the second phase and the first phase to the symbols after the gap.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
   receiving a signal including a gap in time, wherein
      the gap corresponds to a position between a first set of symbols of the signal and a second set of symbols of the signal,
      the gap corresponds to uplink subframes or corresponds to downlink subframes with a different center frequency from the first set of symbols and the second set of symbols,
      the first set of symbols includes a first plurality of consecutive downlink symbols, and
      the second set of symbols includes a second plurality of consecutive downlink symbols;
   determining a phase correction based on a comparison of a first phase from at least one symbol of the first set of symbols before the gap and a second phase from at least one symbol of the second set of symbols after the gap;
   applying the phase correction to the second set of symbols of the signal after the gap; and
   performing channel estimation or Doppler estimation using the first set of symbols of the signal before the gap and the second set of symbols of the signal after the gap after applying the phase correction to the second set of symbols.

2. The method of claim 1, wherein the first set of symbols and the second set of symbols have a same center frequency.

3. The method of claim 1, wherein the phase correction is determined based at least in part on a signal-to-noise ratio (SNR) associated with the signal.

4. The method of claim 3, wherein the first phase is associated with a last symbol of the first set of symbols, and the second phase is associated with a first symbol of the second set of symbols, and
   wherein, when the SNR exceeds a threshold SNR, the phase correction is based on a difference between the second phase and the first phase.

5. The method of claim 4, further comprising:
   processing the signal as a continuous signal by rearranging the positioning of the first symbol of the second set of symbols to a location next to the last symbol of the first set of symbols.

6. The method of claim 3, wherein the first phase is associated with a first average phase of the first set of symbols, and the second phase is associated with a second average phase of the second set of symbols, and
   wherein, when the SNR does not exceed an SNR threshold, the phase correction is based on a difference between the second phase and the first phase.

7. The method of claim 1, further comprising:
   selecting a center frequency, from a plurality of center frequencies associated with the signal, based on a size of the gap associated with the center frequency, wherein the first set of symbols, the second set of symbols, and the gap are associated with the selected center frequency.

8. The method of claim 7, wherein the size of the gap associated with the selected center frequency corresponds to a smallest gap of the respective gaps of the plurality of center frequencies.

9. The method of claim 1, wherein the phase correction is determined when a size of the gap satisfies a size threshold.

10. The method of claim 1, wherein the phase correction is based on a difference between the second phase and the first phase.

11. The method of claim 1, wherein the first phase corresponds to a first average phase of the first set of symbols, the second phase corresponds to a second average phase of the second set of symbols, and
    wherein the phase correction is based on a difference between the second phase and the first phase.

12. The method of claim 1, wherein the UE performs the channel estimation using the first set of symbols of the signal before the gap and the second set of symbols of the signal after the gap after applying the phase correction to the second set of symbols.

13. The method of claim 1, wherein the UE performs the Doppler estimation using the first set of symbols of the signal before the gap and the second set of symbols of the signal after the gap after applying the phase correction to the second set of symbols.

14. The method of claim 1, wherein the first set of symbols and the second set of symbols are selected after a phase locked loop of the UE is locked to a random initial phase value and the second set of symbols has a same center frequency as the first set of symbols.

15. An apparatus for wireless communication at a User Equipment (UE), comprising:
    a memory; and
    at least one processor coupled to the memory and configured to:
       receive a signal including a gap in time, wherein
          the gap corresponds to a position between a first set of symbols of the signal and a second set of symbols of the signal,
          the gap corresponds to uplink subframes or corresponds to downlink subframes with a different center frequency from the first set of symbols and the second set of symbols,
          the first set of symbols includes a first plurality of consecutive downlink symbols, and
          the second set of symbols includes a second plurality of consecutive downlink symbols;
       determine a phase correction based on a comparison of a first phase from at least one symbol of the first set of symbols before the gap and a second phase from at least one symbol of the second set of symbols after the gap;
       apply the phase correction to the second set of symbols of the signal after the gap; and perform channel estimation or Doppler estimation using the first set of symbols of the signal before the gap and the second set of symbols of the signal after the gap after applying the phase correction to the second set of symbols.

16. The apparatus of claim 15, wherein the first set of symbols and the second set of symbols have a same center frequency.

17. The apparatus of claim 15, wherein the phase correction is determined based at least in part on a signal-to-noise ratio (SNR) associated with the signal.

18. The apparatus of claim 15, wherein the at least one processor is further configured to:
select a center frequency, from a plurality of center frequencies associated with the signal, based on a size of the gap associated with the center frequency, wherein the first set of symbols, the second set of symbols, and the gap are associated with the selected center frequency.

19. The apparatus of claim 18, wherein the size of the gap associated with the selected center frequency corresponds to a smallest gap of the respective gaps of the plurality of center frequencies.

20. The apparatus of claim 15, wherein the first phase corresponds to a first average phase of the first set of symbols, the second phase corresponds to a second average phase of the second set of symbols, and
wherein the phase correction is based on a difference between the second phase and the first phase.

21. The apparatus of claim 15, wherein the UE performs the channel estimation using the first set of symbols of the signal before the gap and the second set of symbols of the signal after the gap after applying the phase correction to the second set of symbols.

22. The apparatus of claim 15, wherein the UE performs the Doppler estimation using the first set of symbols of the signal before the gap and the second set of symbols of the signal after the gap after applying the phase correction to the second set of symbols.

23. The apparatus of claim 15, wherein the first set of symbols and the second set of symbols are selected after a phase locked loop of the UE is locked to a random initial phase value and the second set of symbols has a same center frequency as the first set of symbols.

24. An apparatus for wireless communication at a User Equipment (UE), comprising:
means for receiving a signal including a gap in time, wherein
the gap corresponds to a position between a first set of symbols of the signal and a second set of symbols of the signal,
the gap corresponds to uplink subframes or corresponds to downlink subframes with a different center frequency from the first set of symbols and the second set of symbols,
the first set of symbols includes a first plurality of consecutive downlink symbols, and
the second set of symbols includes a second plurality of consecutive downlink symbols;
means for determining a phase correction based on a comparison of a first phase from at least one symbol of the first set of symbols before the gap and a second phase from at least one symbol of the second set of symbols after the gap;
means for applying the phase correction to the second set of symbols of the signal after the gap; and
means for performing channel estimation or Doppler estimation using the first set of symbols of the signal before the gap and the second set of symbols of the signal after the gap after applying the phase correction to the second set of symbols.

25. The apparatus of claim 24, wherein the phase correction is determined based at least in part on a signal-to-noise ratio (SNR) associated with the signal.

26. The apparatus of claim 25, wherein the first phase is associated with a last symbol of the first set of symbols, and the second phase is associated with a first symbol of the second set of symbols, and
wherein, when the SNR exceeds a threshold SNR, the phase correction is based on a difference between the second phase and the first phase.

27. The apparatus of claim 26, further comprising:
means for processing the signal as a continuous signal by rearranging the positioning of the first symbol of the second set of symbols to a location next to the last symbol of the first set of symbols.

28. The apparatus of claim 25, wherein the first phase is associated with a first average phase of the first set of symbols, and the second phase is associated with a second average phase of the second set of symbols, and
wherein, when the SNR does not exceed an SNR threshold, the phase correction is based on a difference between the second phase and the first phase.

29. A non-transitory computer-readable medium storing computer executable code, comprising code to:
receive a signal including a gap in time, wherein
the gap corresponds to a position between a first set of symbols of the signal and a second set of symbols of the signal,
the gap corresponds to uplink subframes or corresponds to downlink subframes with a different center frequency from the first set of symbols and the second set of symbols,
the first set of symbols includes a first plurality of consecutive downlink symbols, and
the second set of symbols includes a second plurality of consecutive downlink symbols;
determine a phase correction based on a comparison of a first phase from at least one symbol of the first set of symbols before the gap and a second phase from at least one symbol of the second set of symbols after the gap;
apply the phase correction to the second set of symbols of the signal after the gap; and
perform channel estimation or Doppler estimation using the first set of symbols of the signal before the gap and the second set of symbols of the signal after the gap after applying the phase correction to the second set of symbols.

* * * * *